United States Patent
Haberl et al.

(10) Patent No.: US 11,427,063 B2
(45) Date of Patent: Aug. 30, 2022

(54) LOCKING DEVICE HAVING DETENT HOOKS AND TOP HAVING A LOCKING DEVICE

(71) Applicant: Webasto SE, Stockdorf (DE)

(72) Inventors: Franz Haberl, Stockdorf (DE); Christian Rudolfi, Stockdorf (DE); Johannes Haidl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 474 days.

(21) Appl. No.: 16/721,189

(22) Filed: Dec. 19, 2019

(65) Prior Publication Data
US 2020/0198452 A1 Jun. 25, 2020

(30) Foreign Application Priority Data
Dec. 19, 2018 (DE) .......... 10 2018 132 836

(51) Int. Cl.
*B60J 7/19* (2006.01)
*E05C 19/14* (2006.01)

(52) U.S. Cl.
CPC .......... *B60J 7/194* (2013.01); *E05C 19/14* (2013.01); *E05Y 2900/542* (2013.01)

(58) Field of Classification Search
CPC ........ B60J 17/194; B60J 7/185; B60J 7/1851; B60J 7/1853; E05C 19/10; E05C 19/14; E05C 3/045; E05C 3/046; E05C 3/00; E05C 3/12; E05Y 2900/542; Y10T 292/0911; Y10T 292/0945; Y10T 292/9048; Y10T 292/0926; Y10T 292/0928; Y10T 292/1043; Y10T 292/1078; Y10T 292/1039; Y10T 292/1082; E05B 17/0029; E05B 81/00; E05B 81/04; E05B 77/02;
(Continued)

(56) References Cited

U.S. PATENT DOCUMENTS 7,559,585 B2 7/2009 Plesternings et al.
2009/0243307 A1* 10/2009 Lee .................. E05B 77/06
292/93
(Continued)

FOREIGN PATENT DOCUMENTS

DE 4332443 A1 4/1995
DE 202008003372 * 6/2008
DE 202008003372 U1 6/2008
(Continued)

*Primary Examiner* — Christine M Mills
*Assistant Examiner* — Yahya Sidky
(74) *Attorney, Agent, or Firm* — Quarles & Brady LLP (57) ABSTRACT

A locking device for fixing a top of a convertible vehicle at a front header of a convertible vehicle, including an actuating portion and an engagement portion, said actuating portion having a locking hook that can be pivoted between a cleared position and a closed position in which it is engaged with the engagement portion. A securing element is provided that assumes a rest position during normal operation and is pretensioned in the direction of a blocked position using a spring and that is secured in the rest position using a retaining element that can be adjusted by way of a trigger element in such a manner that the securing element is released and that the spring shifts the securing element into its blocked position so that it secures the locking hook in the closed position thereof.

16 Claims, 14 Drawing Sheets

(58) Field of Classification Search
CPC .......... E05B 77/04; E05B 77/06; E05B 63/18; Y10S 292/22
See application file for complete search history.

(56) References Cited

U.S. PATENT DOCUMENTS

2014/0361574 A1* 12/2014 Wullrich .................. E05C 3/12
296/121
2020/0046582 A1* 2/2020 Hincapie Montoya ......................
E05C 19/168

FOREIGN PATENT DOCUMENTS

DE 102017117042 A1 * 1/2019
JP 2007120076 A 5/2007

* cited by examiner

LOCKING DEVICE HAVING DETENT HOOKS AND TOP HAVING A LOCKING DEVICE

CROSS REFERENCE TO RELATED APPLICATION

This application claims priority to German Patent Application No. 10 2018 132 836.2 filed Dec. 19, 2018. The contents of this application is hereby incorporated by reference as if set forth in its entirety herein.

FIELD OF THE INVENTION

The disclosure relates to a locking device for fixing a top of a convertible vehicle at a front header of a convertible vehicle as well as to a top of a convertible vehicle having such a locking device.

BACKGROUND

A locking device of the type referred to in the introduction is known from document DE 20 2008 003 372 U1 and serves to fix a top of a convertible vehicle, in particular a rigid front top element that can be a front bow of a folding top or a rigid roof element of an RHT (retractable hard top), at a front header of the respective vehicle. The locking device comprises an actuating portion having a hook and an engagement portion that can be made to engage with the hook that can be pivoted between a cleared position and a closed position. With such a locking device, there is, however, the risk of the hook coming out of engagement with the engagement portion in an accident situation, in particular with forces acting in the transverse direction of the respective vehicle, which in turn might result in the top coming out of engagement with the vehicle bodywork.

SUMMARY

It is the object of the disclosure to create a locking device that is realized in accordance with the kind referred to in the introduction, having an improved crash safety, and a top having such a locking device.

This means that, in accordance with the disclosure, a locking device is proposed with which a securing element, in an accident or crash situation, assumes a blocked position that prevents the locking hook from being shifted into its cleared position. The securing element, in its blocked position, is either disposed in the range of movement of the locking hook or in the range of movement of kinematics for adjusting the locking hook. Through the securing element, the locking device is consequently prevented from being opened or opened to an undesired extent. The securing element consequently causes the maximum tractive force that can act on the locking hook to be increased as compared to the known locking device described above. The locking device according to the disclosure is in particular suitable for being used with convertible vehicles, with which high loads can occur in the region of the top in an accident situation.

In a special embodiment of the locking device according to the disclosure, the securing element is a securing stud. The stud can be pretensioned in the direction of the blocked position using the spring. The retaining element maintains the stud in its rest position. When cleared, i.e. when the trigger element for the retaining element is actuated, the stud abruptly shoots into the cleared position owing to the power of the spring, which prevents the locking hook from being adjusted. This means that a securing element that is realized in such a manner is realized in the manner of a rifle trigger.

In another special embodiment of the locking device according to the disclosure, the retaining element is a ratchet. The ratchet engages, for securing the securing element in the rest position, with a recess thereof. If the ratchet is moved out of the recess, the securing element is automatically adjusted into the blocked position.

The trigger element, using which the retaining element can be actuated, in a preferred embodiment of the locking device according to the disclosure is a lever having an adjusting surface against which the ratchet rests. Pivoting the lever leads to the ratchet being adjusted, which results in the same releasing the securing element.

Expediently, the lever is borne so as to be pivotable and presents, in a special embodiment, an adjusting mass that can be realized as an end thickening or be formed from an additional weight and that pivots said lever starting from a certain lateral acceleration. Consequently, it is ensured that the mechanism is triggered and the securing element is released independently of component part deformations and component part rigidities. Instead, an increased lateral acceleration that occurs in an accident situation and that does not correspond to the accelerations during a normal driving situation is sufficient to actuate the retaining element or the ratchet and to release the securing element so that the latter is shifted, through the spring, into its blocked position. The adjusting mass and the lever can be realized in such a way that the lateral acceleration can act from both sides of the respective vehicle. Independently of the direction of rotation of the lever, the ratchet is consequently actuated.

In an alternative embodiment of the locking device according to the disclosure, the lever presents an adjusting end, for example tab-like, that rests against a deformable element of the top in the installation position, in particular against a deformable element of a front bow or of a front roof shell of an RHT.

The ratchet of the locking device according to the disclosure is in particular realized as a lever that is borne so as to be pivotable and that presents a projection engaging a lateral recess of the securing element in the rest position thereof. Pivoting the lever leads to the securing element being released so that it can shift into its blocked position.

In order to guarantee that the ratchet, during normal operation of the respective vehicle, maintains the securing element in its rest position, the ratchet, preferably using a retaining spring, is pressed against the securing element.

The locking device according to the disclosure can be realized in a variety of manners. For example, the actuating portion of the locking device comprises a link arrangement for adjusting the locking hook. The link arrangement can be realized in such a way that it forms a four-arm hinge arrangement together with the locking hook and a bearing pedestal or a locking support.

The locking hook may be part of the link arrangement and may be articulated to an articulation lever and to a control lever, said articulation lever and said control lever being articulated to the locking support.

Furthermore, the locking device can be designed in such a manner that an opening spring is provided that pretensions the locking hook in the direction of its cleared position. In the closed position of the top, the locking hook is for example secured using the drive.

Further advantages and advantageous configurations of the subject-matter of the disclosure can be taken from the drawing, from the description and from the claims.

BRIEF DESCRIPTION OF THE DRAWINGS

In the drawing, two exemplary embodiments of a locking device according to the disclosure are illustrated in a schematically simplified manner and will be explained in more detail in the following description.

DETAILED DESCRIPTION

Figure 1:
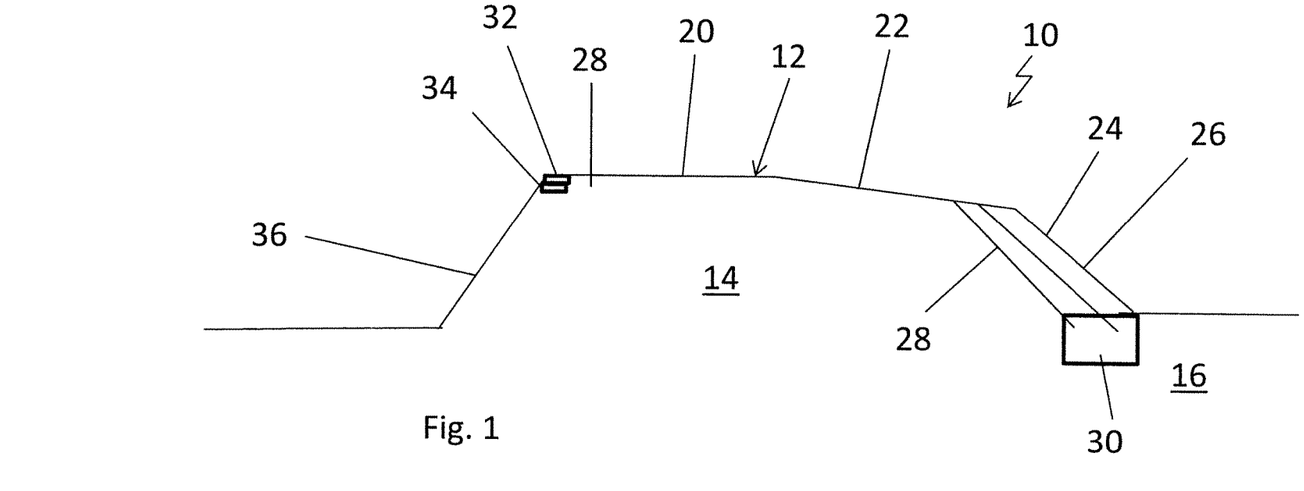
FIG. 1 shows a strongly schematic side view of a convertible vehicle having a top.

In FIG. 1, a convertible vehicle 10 is illustrated that comprises a top 12 that is realized as an RHT and is adjustable and that can be shifted between a closed-top position, which is illustrated in FIG. 1 and in which a vehicle interior 14 is covered, and a storage position, which is not illustrated in more detail and in which the vehicle interior 14 is cleared to the top and in which said top is received by a rear top storage space 16 of the vehicle 10.

The top 12 comprises, in the present case, three rigid roof shells, namely a front roof shell 20, a middle roof shell 22 and a rear window shell 24, which comprises a rear window 26 of the top 12.

It is also conceivable to realize the top as a folding top or as a panel bow top, the front roof shell then constituting a front bow that is covered by a top cloth.

For being shifted between the closed-top position and the storage position, the top 12 comprises a linkage 28 that is realized in a substantially mirror-symmetrical fashion in relation to a vertical longitudinal center plane of the top and is borne, so as to be pivotable, at a rear main bearing 30 that is fixed relative to the vehicle on each of its two sides. For securing the closed-top position, the top 12 comprises a locking device 32 that is illustrated in more detail in FIGS. 2 to 13 and constitutes a front catch using which the front roof shell 20 can be fixed at a front header 34 of the vehicle 10, which forms an upper leg of a frame of a windshield 36 that extends in the transverse direction of the vehicle.

Figure 2:
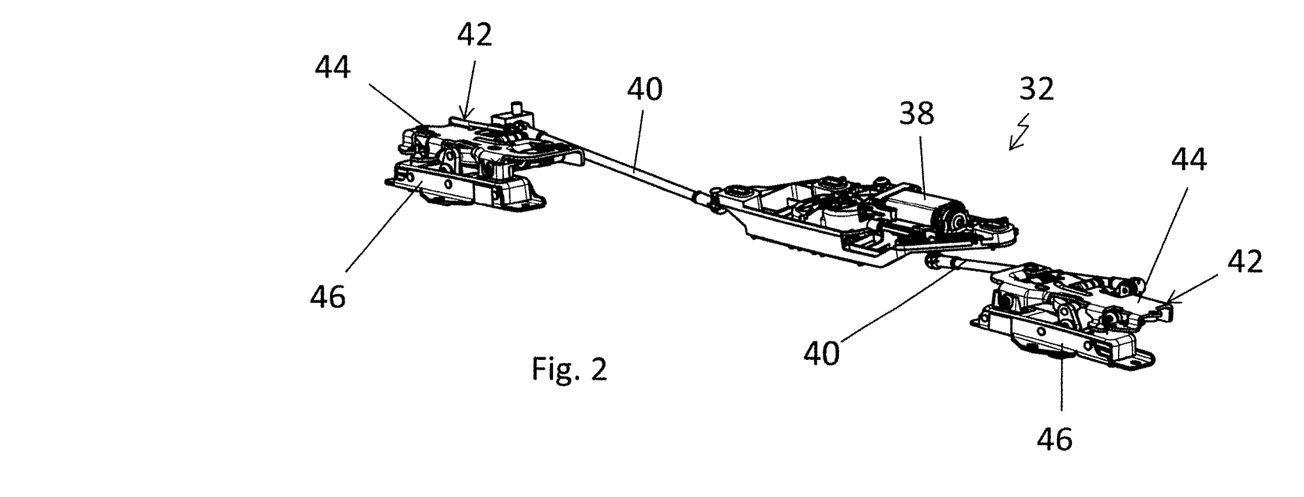
FIG. 2 shows a perspective view of a front catch of the top.

The locking device 32 comprises a drive motor 38 that is realized as an electric motor and that is substantially disposed in the center in relation to the width of the top and drives two drive rods 40 each coupled to a locking unit 42.

The locking units 42 each comprise an actuating portion 44 that is fastened to the top 12 and an engagement portion 46 that is fixed at the front header 34.

The two locking units 42 are realized in a substantially mirror-symmetrical fashion with respect to each other, which is why, in the following, reference is only made to the locking unit that is disposed on the left in relation to the orientation of the top.

Figure 3:
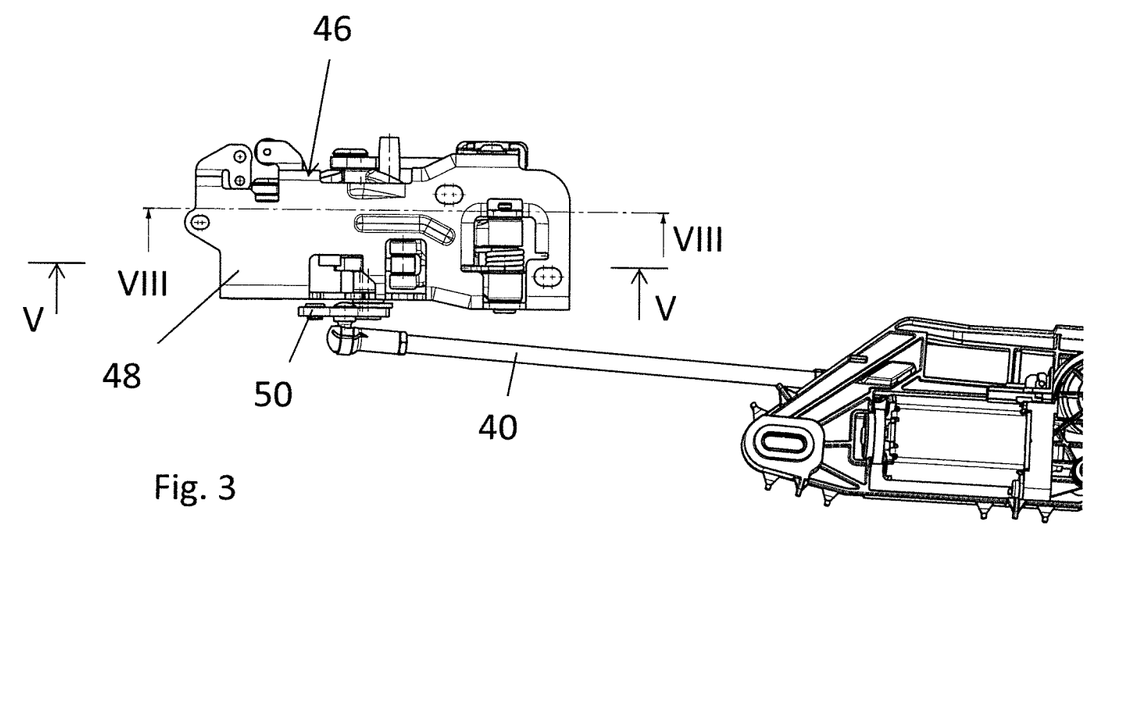
FIG. 3 shows a view from above onto a locking unit of the front catch that is disposed on the left in relation to the orientation of the top.
Figure 4:
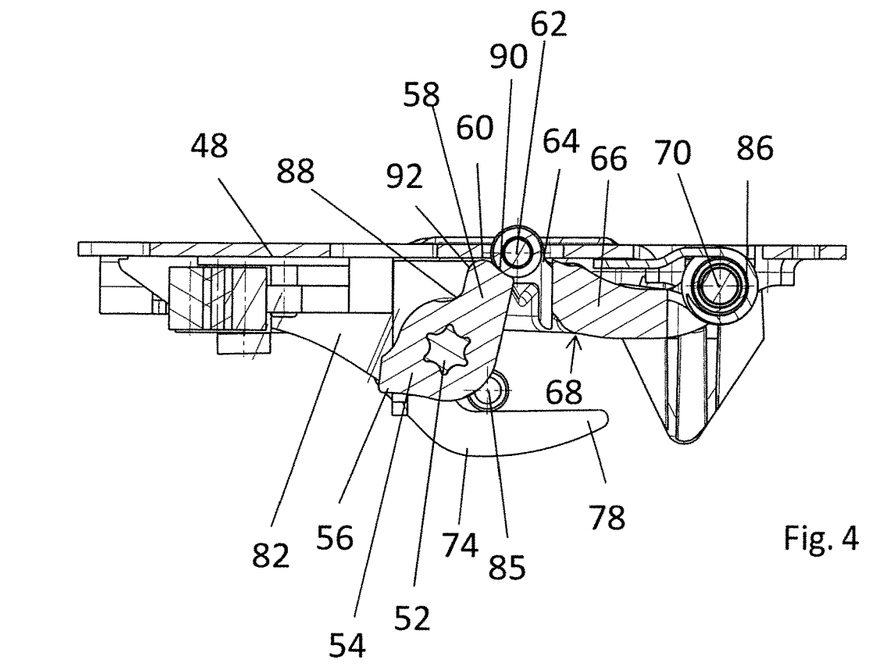
FIG. 4 shows a section through the locking unit according to FIG. 3 along a line V-V in FIG. 3 in a closed position of a locking hook.
Figure 5:
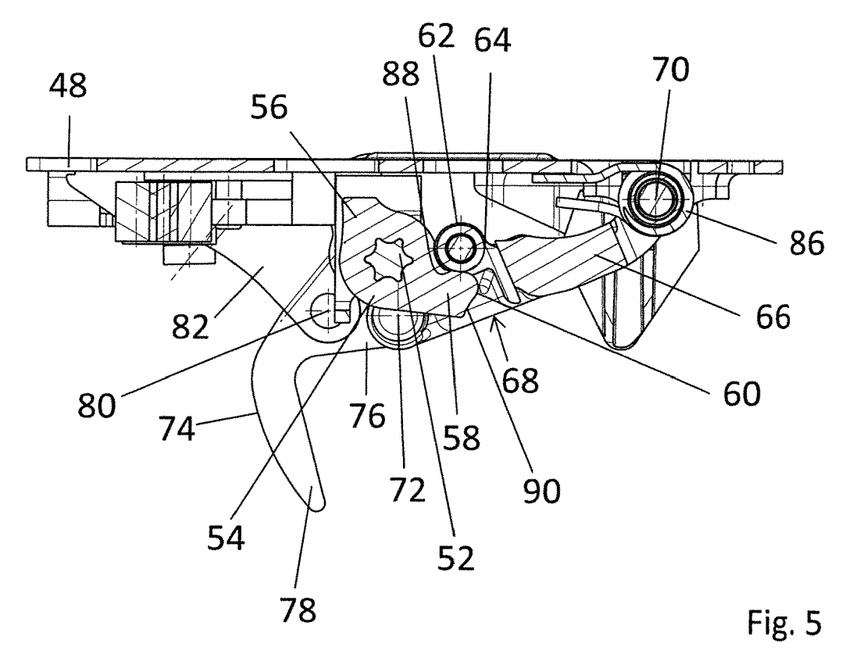
FIG. 5 shows a section through the locking unit that corresponds to FIG. 4, but in a cleared position of the locking hook.
Figure 6:
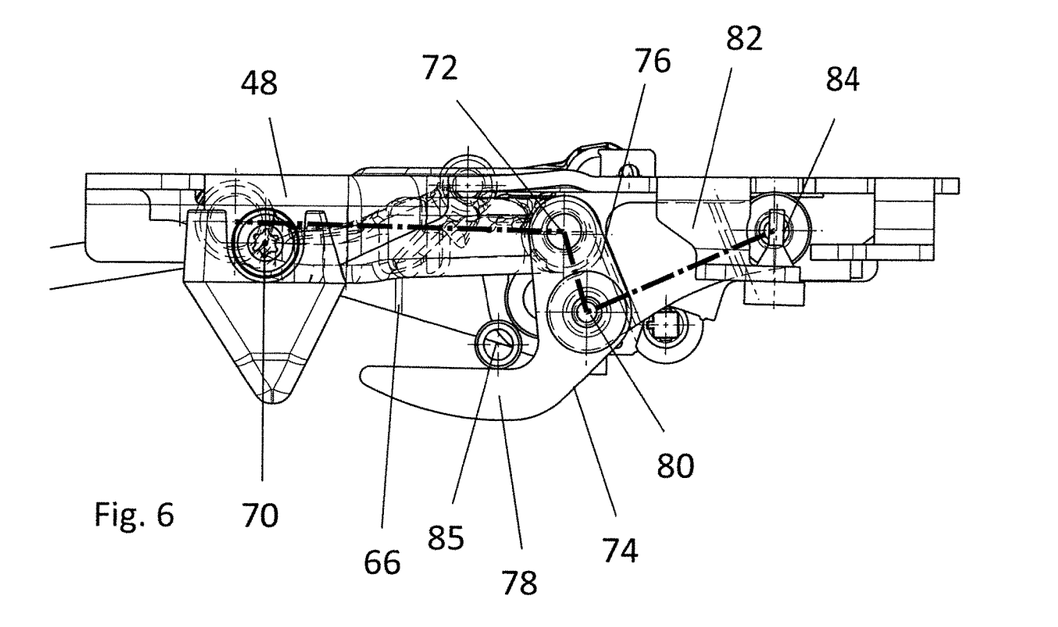
FIG. 6 shows a front view of the locking unit in the closed position of the locking hook.
Figure 7:
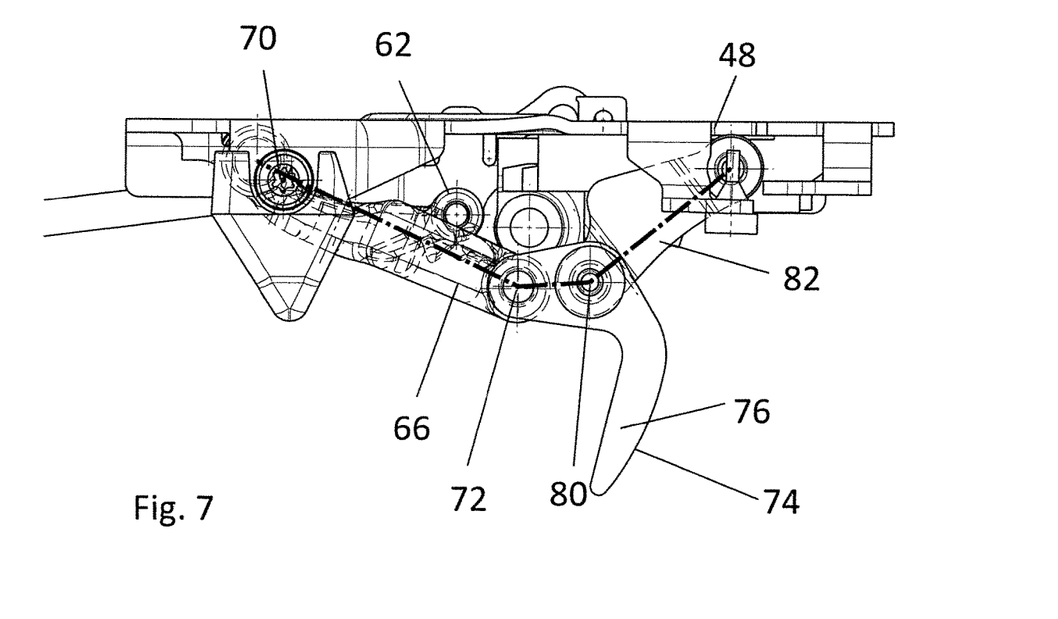
FIG. 7 shows a front view of the locking unit that corresponds to FIG. 6, but in the open position of the locking hook.

The actuating portions 44 that are fixed relative to the top, of the locking units 42, each comprise a locking support 48 that is fastened to the bottom side of the front roof shell 20 and at which a drive lever 50, which is connected to the drive rod 40 in question so as to be rotatable. The drive lever 50, via a drive shaft 52, is connected to an adjusting lever 54 that is realized so as to be L-shaped in the broadest sense and presents a stop leg 56 and an active leg 58 that is inclined at an angle of approximately 90° as against the stop leg 56. The stop leg 56 limits the pivoting angle of the adjusting lever 54 by interacting with counterstops, which are realized at the locking support 48.

As it can be taken from FIGS. 4 to 7, the active leg 58 of the adjusting lever 54 has a cam profile or cam surface 60 at its face side facing away from the drive shaft 52, said cam profile or cam surface interacting with an adjusting roller 62 that is borne, so as to be rotatable, at an extension 64 of an articulation lever 66 of a four-arm hinge arrangement 68. The articulation lever 66, via a hinge point 70, is borne at the locking support 48 so as to be pivotable and, via a hinge point 72, is connected to a locking hook 74 at its end facing away from the hinge point 70. The locking hook 74, which has a bearing portion 76 and a gripping portion 78, via another hinge point 80, is connected to a control lever 82, which, via a hinge point 84, is borne so as to be pivotable at the locking support 48. The locking support 48, the articulation lever 66, the locking hook 74 and the control lever 82 in this way form the four-arm hinge arrangement 68. In its closed position, the locking hook 74 secures the top 12 at the front header 34 via its gripping portion 78 by reaching behind a locking stud 85, which is realized at the engagement portion 46 that is fixed relative to the front header. When shifting the top 12 into its storage position, the locking hook 74 is moved into its cleared position. In order to be able to move the locking hook 74 into its cleared position, an opening or torsion spring 86, which acts on the articulation lever 66 and presses the same away from the locking support 48, is disposed in the region of the hinge point 70.

In order to define the cleared position and the closed position of the locking hook 74, the cam surface 60 of the adjusting lever 54 presents a first holding notch 88 and a second holding notch 90. The adjusting roller 62 is in the first holding notch 88 in the cleared position of the locking hook 74 (cf. FIG. 5). The adjusting roller 62 is in the second holding notch 90 in the closed position of the locking hook 74 (cf. FIG. 4). Upon an actuation of the adjusting lever 54 by actuating the drive motor 38 starting from the closed positon illustrated in FIG. 4, the adjusting roller 62 rolls off via a curved surface 92 until, in the cleared position, it comes to rest in the holding notch 88 of the cam profile 60 of the adjusting lever 54. Through the opening spring 86, the adjusting roller 62 is always pressed against the cam surface 60.

Figure 8:
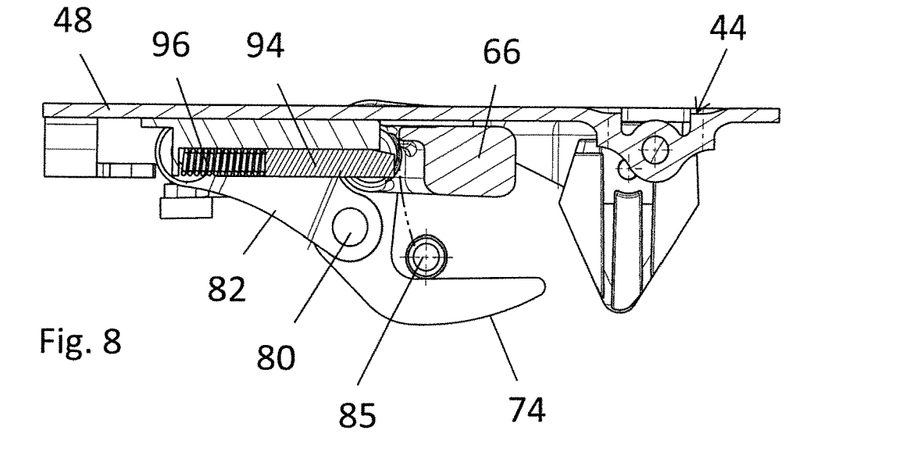
FIG. 8 shows a section through the locking unit along line VIII-VIII in FIG. 3 in the closed position of the locking hook.
Figure 9:
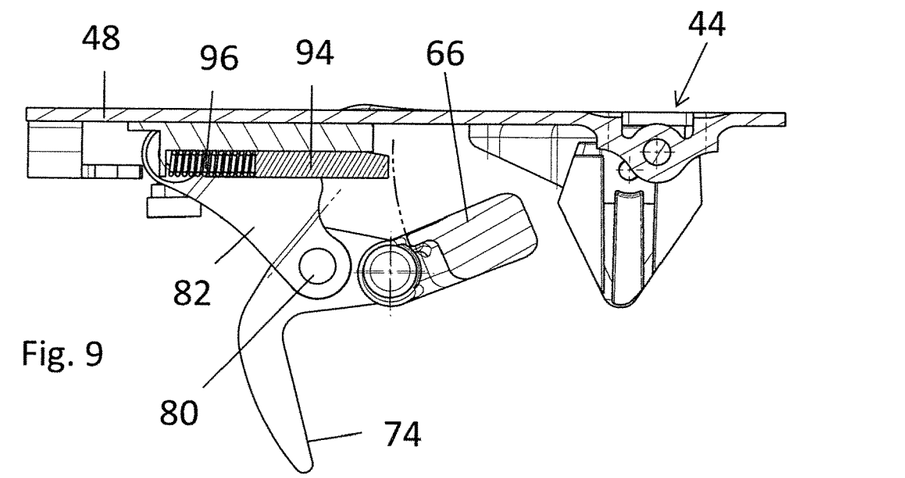
FIG. 9 shows a section through the locking unit that corresponds to FIG. 8, but in the cleared position of the locking hook.
Figure 10:
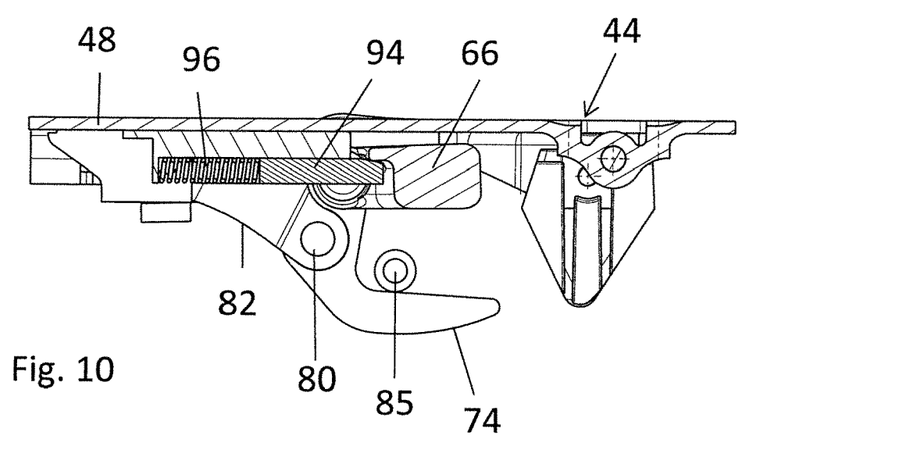
FIG. 10 also shows a section through the locking unit that corresponds to FIG. 8, but in the activated state of a securing stud.
Figure 11:
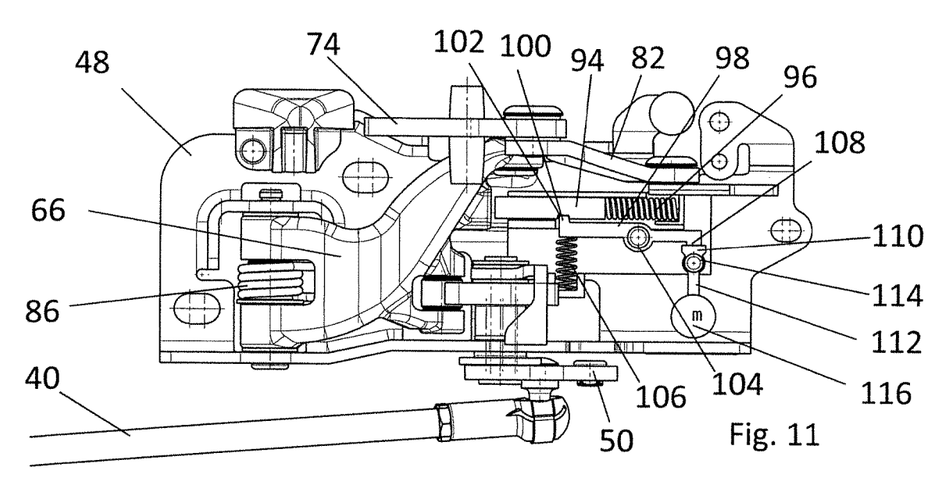
FIG. 11 shows a view from below of the locking unit in the closed position of the locking hook.

In order to be able to reliably secure the top 12, in an accident situation, at the front header 34 and in order to prevent the locking hooks 74 from inadvertently being detached from the studs 85 of the engagement portions 46, the locking units 42, in the region of the actuating portions 44, each present a securing stud 94. The securing stud 94 is borne at the locking support 48 of the actuating portion 44 so as to be axially movable and is pretensioned in the direction of a blocked position using a spring 96, said blocked position being illustrated in FIGS. 10, 12 and 13. In its rest position, which is illustrated in FIGS. 8, 9 and 11, the securing stud 94 is secured using a ratchet 98 that constitutes a retaining element and that engages a lateral recess 102 of the securing stud with a projection 100 and is borne at the locking support 48 via a bearing journal 104 so as to be pivotable. Additionally, a retaining spring 106 is provided that is supported at the locking support 48 and presses the ratchet 98 into the recess 102 with its projection 100. At its end facing away from the projection 100, the ratchet 98 presents a control surface 108 that interacts with an adjusting surface 119 that is realized at a trigger element 112 that is realized from a lever that is borne at the locking support 48 so as to be pivotable at a bearing journal 114 and presents an adjusting mass 116 at its end facing away from the control cam 110, said adjusting mass being formed by a ball-shaped weight.

The securing element that comprises the securing stud 94 works in such a way that it assumes its rest position during normal operation of the respective vehicle, that means that the securing stud 94 is retracted and is pretensioned using the spring 96, the ratchet 98 engaging the recess 102 of the securing stud 94 with its projection 100. The locking hook 74 can thus be freely adjusted using the drive motor 38. The trigger element 112 assumes a middle position.

Figure 12:
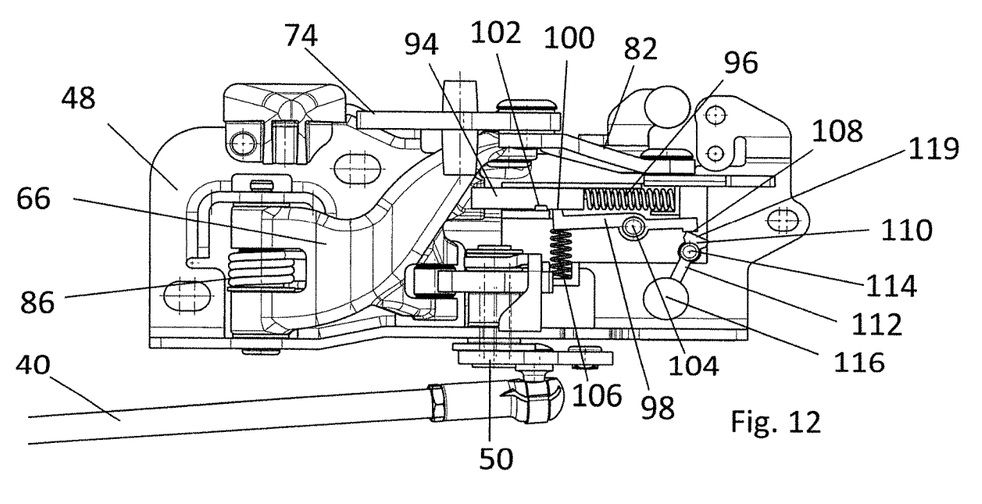
FIG. 12 shows a view from below of the locking unit that corresponds to FIG. 11, but in a first activated situation of the securing stud.
Figure 13:
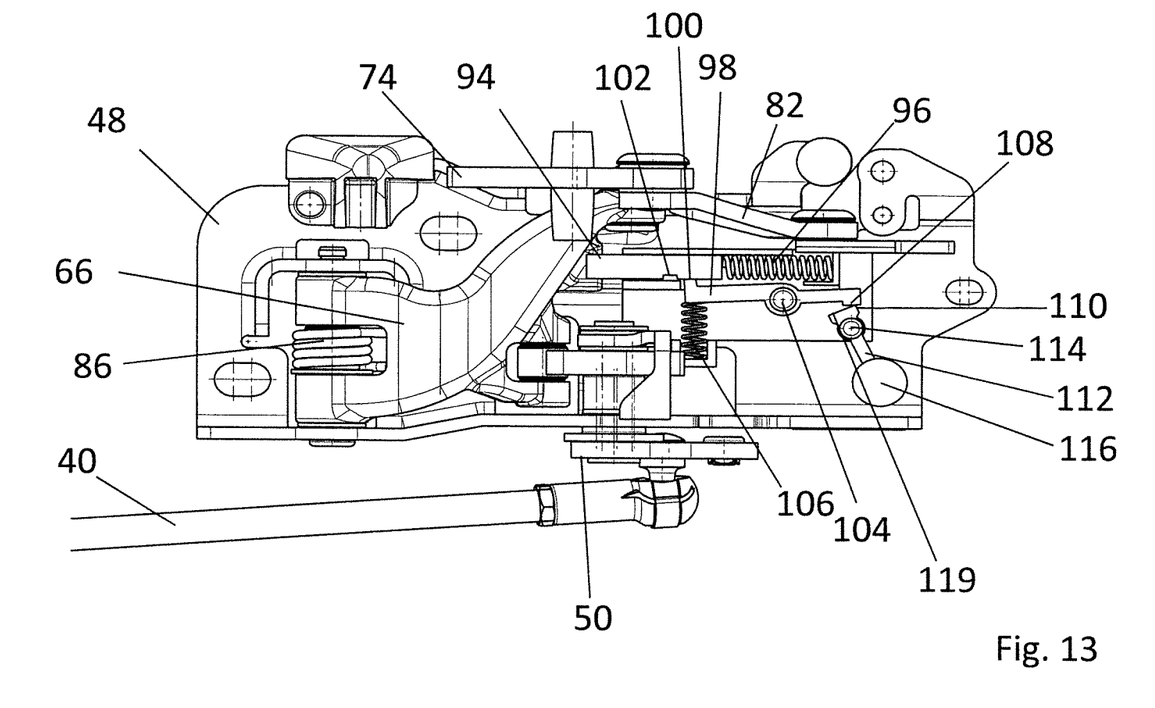
FIG. 13 also shows a view from below of the locking unit that corresponds to FIG. 11, but in a second activated situation of the securing stud.
Figures 14, 15:
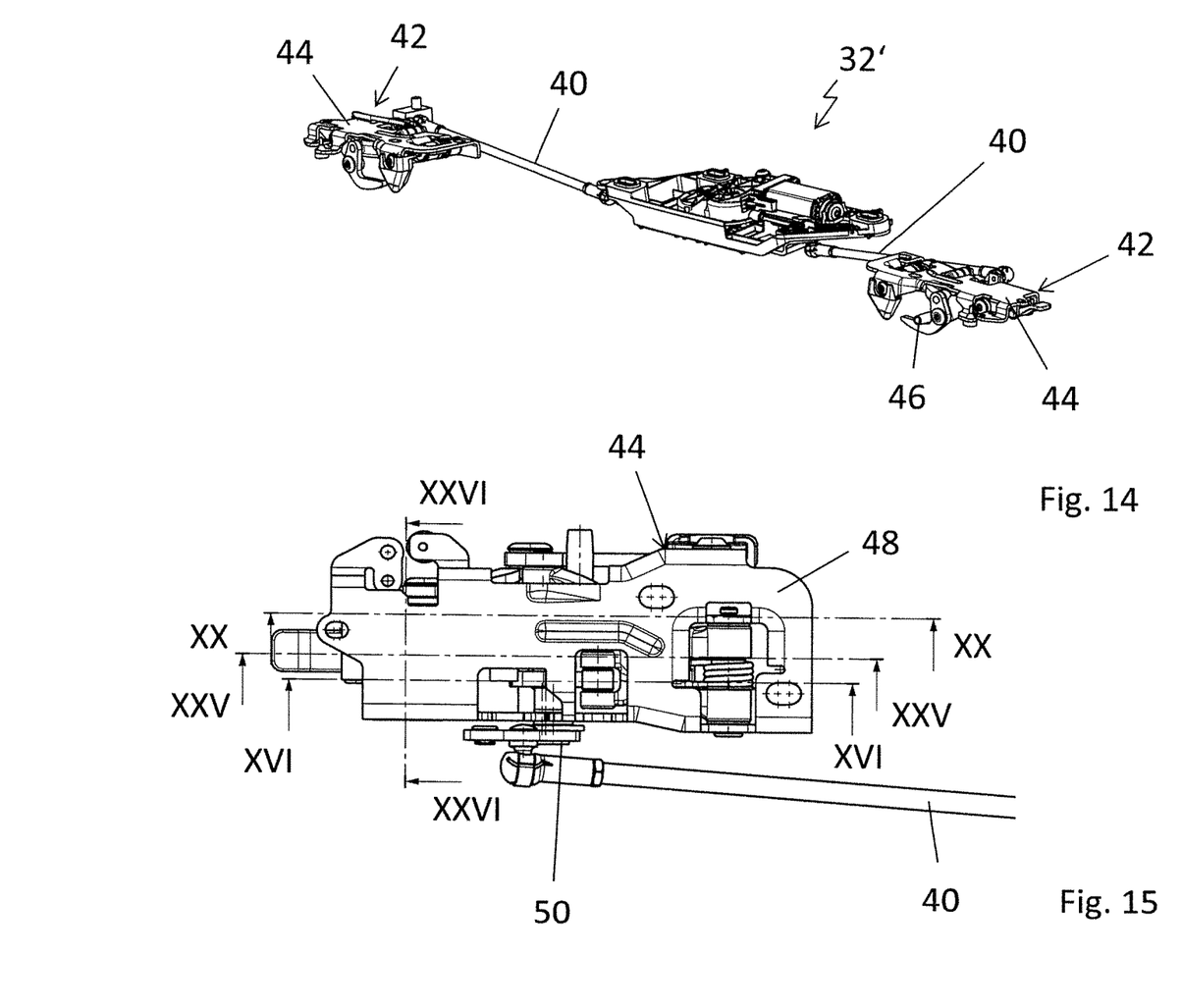
FIG. 14 shows a perspective view of an alternative embodiment of a front catch.
FIG. 15 shows a view from above onto a locking unit of the front catch that is disposed on the left in relation to the orientation of the top, according to FIG. 14.
Figure 16:
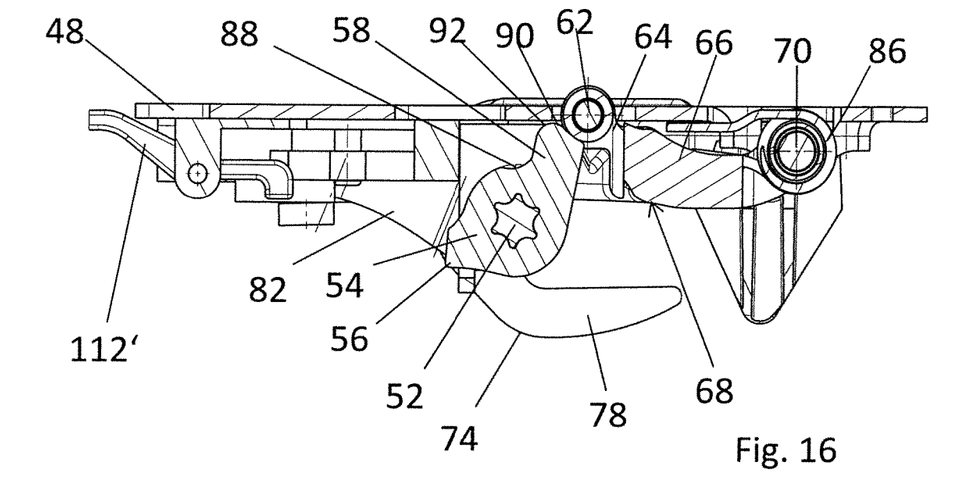
FIG. 16 shows a section through the locking unit according to FIG. 15 along line XVI-XVI in FIG. 15 in a closed position of a locking hook.
Figure 17:
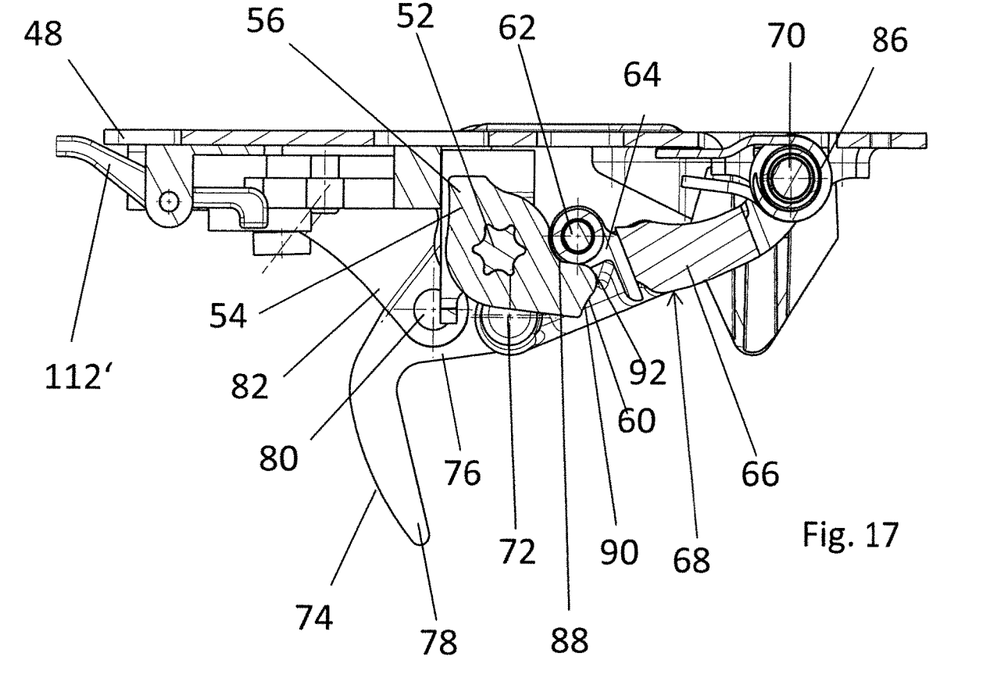
FIG. 17 shows a section through the locking unit that corresponds to FIG. 16, but in a cleared position of the locking hook.
Figure 18:
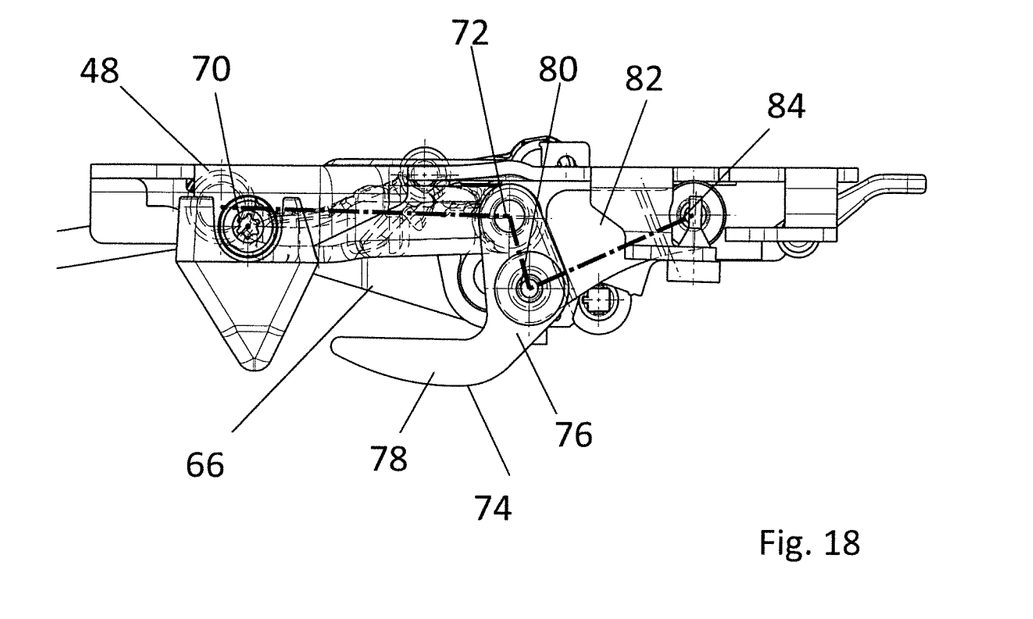
FIG. 18 shows a front view of the locking unit according to FIG. 15 in the closed position of the locking hook.
Figure 19:
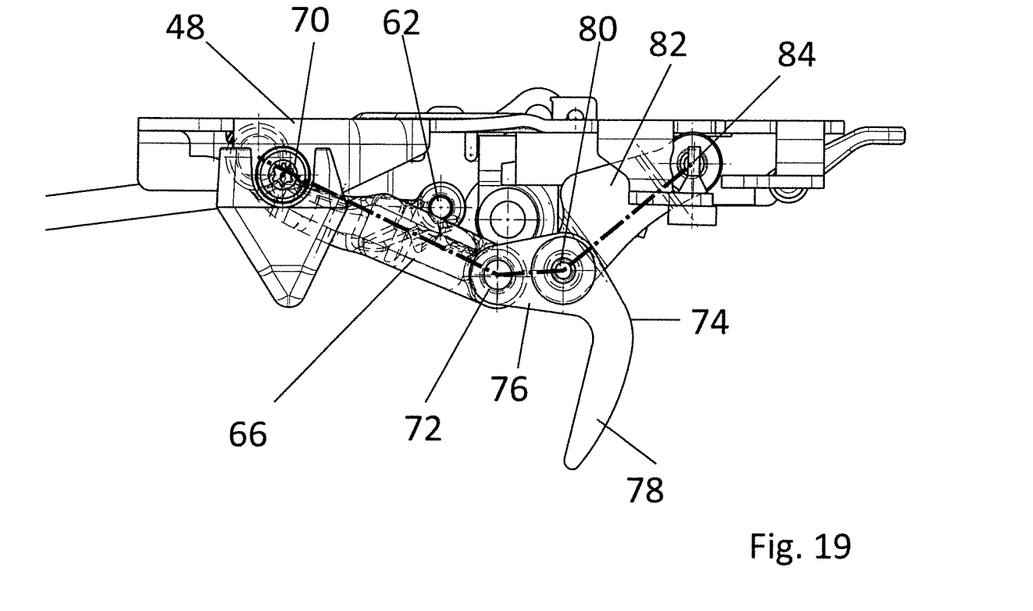
FIG. 19 shows a front view of the locking hook that corresponds to FIG. 18, but in the cleared position of the locking hook.
Figure 20:
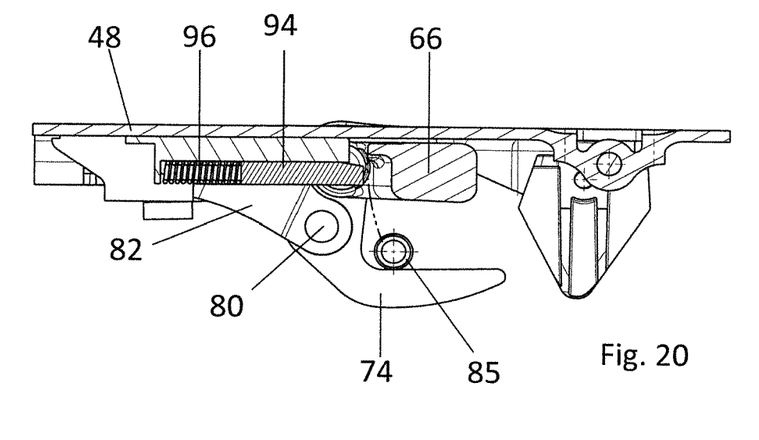
FIG. 20 shows a section through the locking unit according to FIG. 15 along the line XX-XX in FIG. 15 in the closed position of the locking hook.
Figure 21:
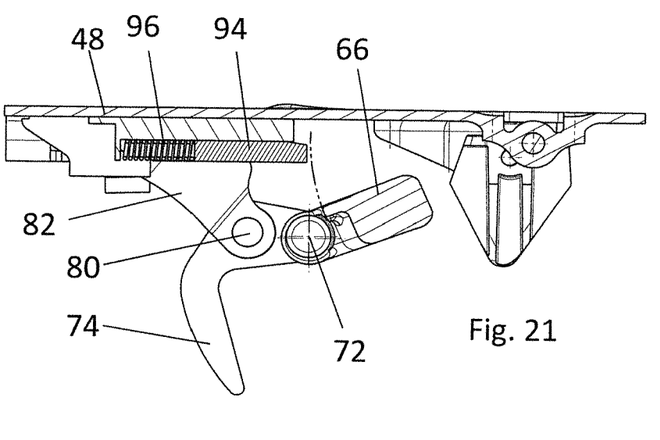
FIG. 21 shows a section through the locking unit according to FIG. 15 that corresponds to FIG. 20, but in a cleared position of the locking hook.
Figure 22:
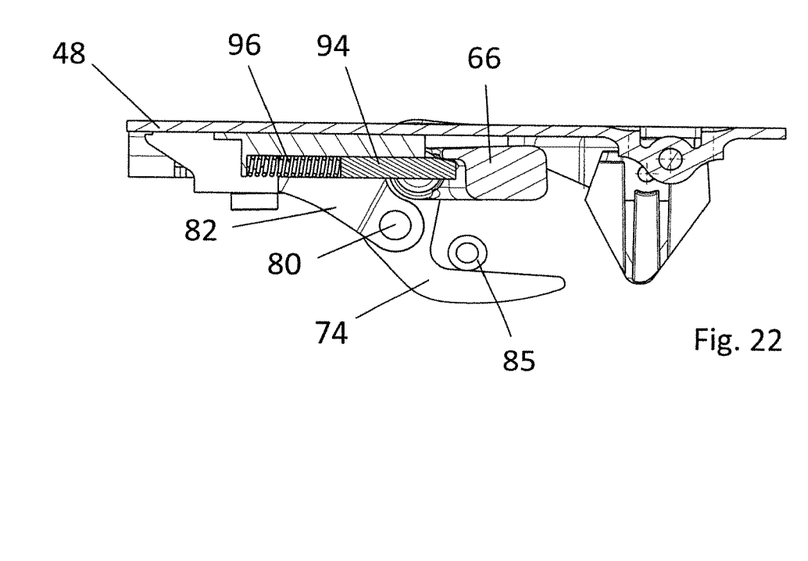
FIG. 22 also shows a section through the locking unit according to FIG. 15 that corresponds to FIG. 20, but in an activated position of a securing stud.
Figure 23:
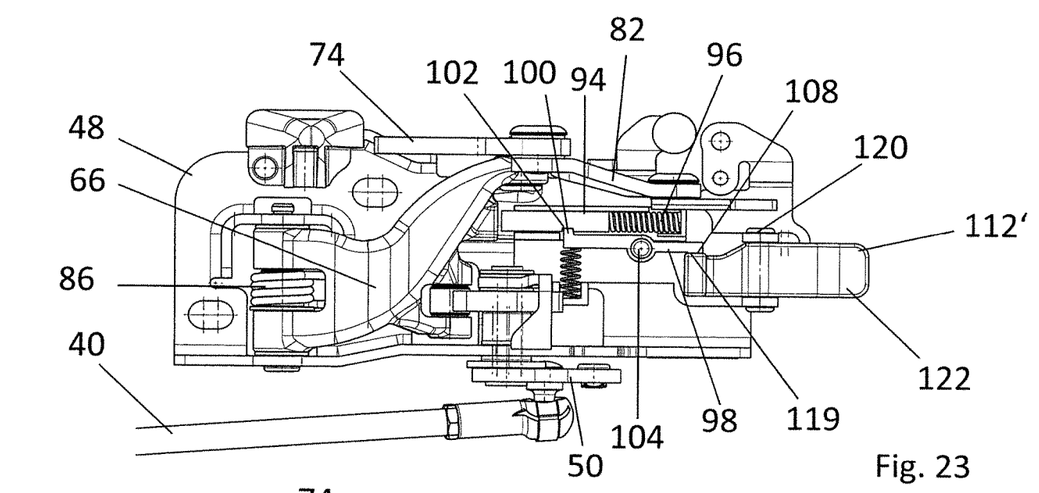
FIG. 23 shows a view from below of the locking unit according to FIG. 15 in the closed position of the locking hook.
Figure 24:
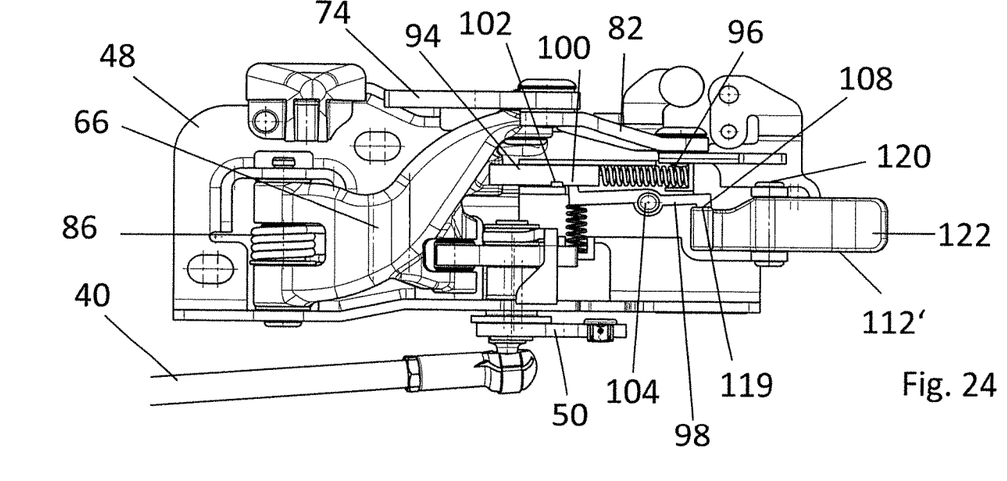
FIG. 24 shows a view from below of the locking unit that corresponds to FIG. 23, but in an activated position of the securing stud.
Figure 25:
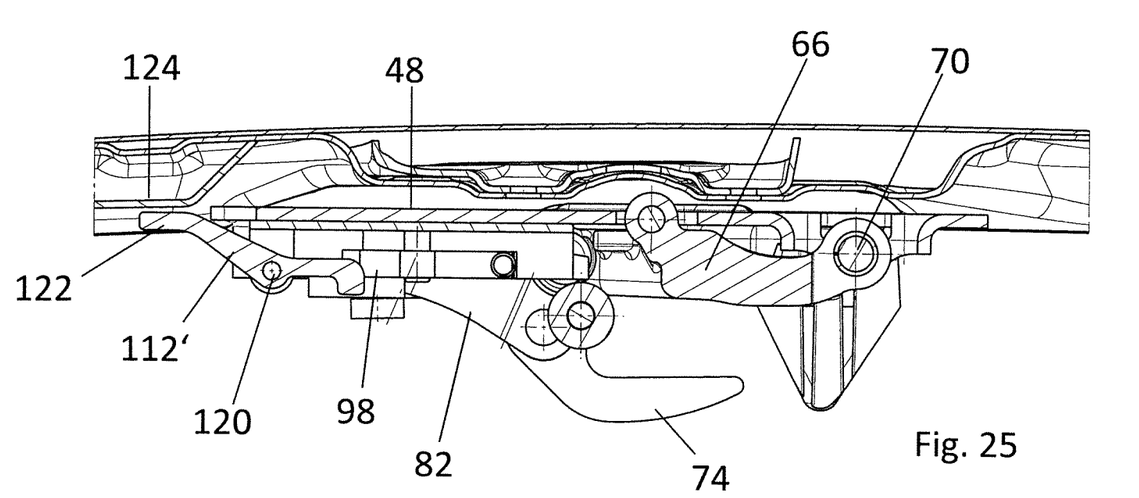
FIG. 25 shows a section through the locking unit according to FIG. 15 along line XXV-XXV in FIG. 15 in the closed position of the locking hook.
Figure 26:
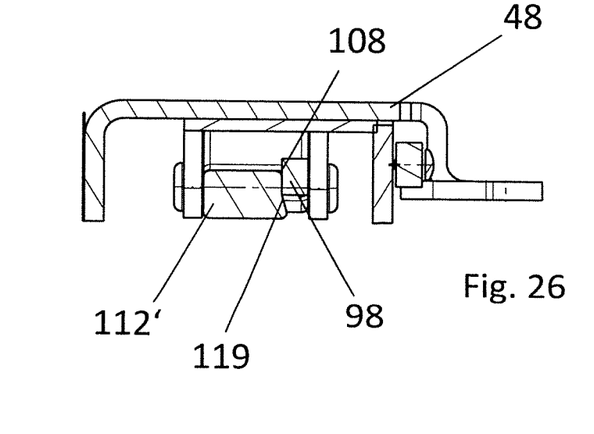
FIG. 26 shows a section through the locking unit according to FIG. 15 along line XXVI-XXVI in FIG. 15 in the closed position of the locking hook.

In an accident situation, in which strong acceleration forces act in the transverse direction of the vehicle, the adjusting mass 116 of the trigger element 112 is, however, moved as against the locking support 48 in the transverse direction of the vehicle (cf. FIGS. 12 and 13). Thus, the trigger element 112 is pivoted about the axis that is formed by the bearing journal 114 (FIG. 12) clockwise or counterclockwise (FIG. 13), and the control cam 110 pushes, through the interaction of the adjusting surface 119 and of the control surfaces 108, the ratchet 98 out of the lateral recess 102 of the securing stud 94, against the force of the retaining spring 106. Said securing stud can then, through the force of the spring 96, shoot from the rest position into the blocked position and secure the articulation lever 66 so that the locking hook 74 cannot be pivoted into its cleared position. The top 12 is consequently secured at the front header 34.

Figure 27:
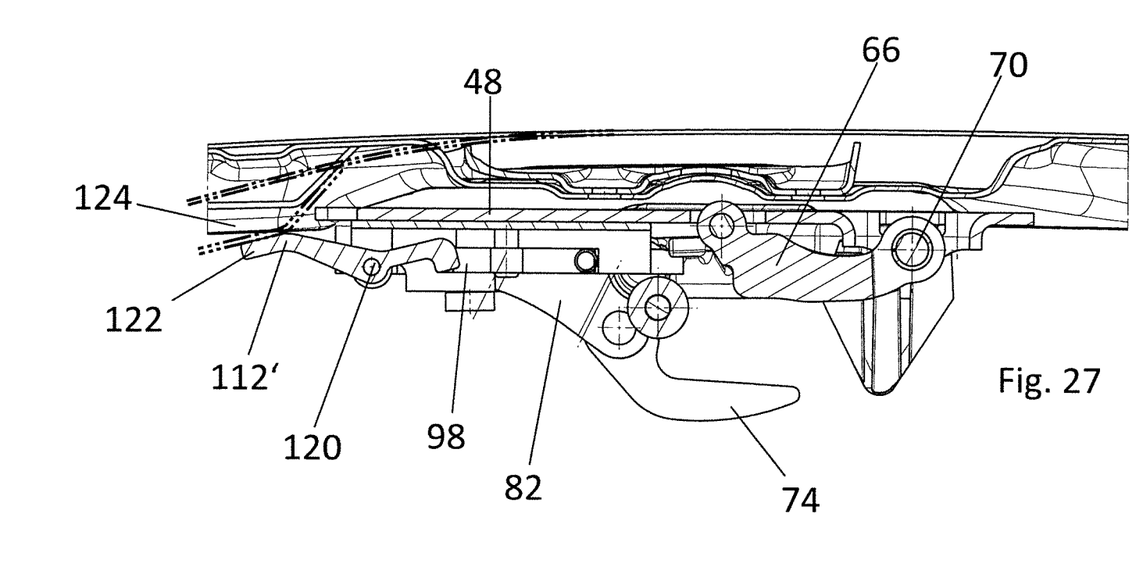
FIG. 27 shows a section through the locking unit according to FIG. 15 that corresponds to FIG. 25, but for the activated position of the securing stud.
Figure 28:
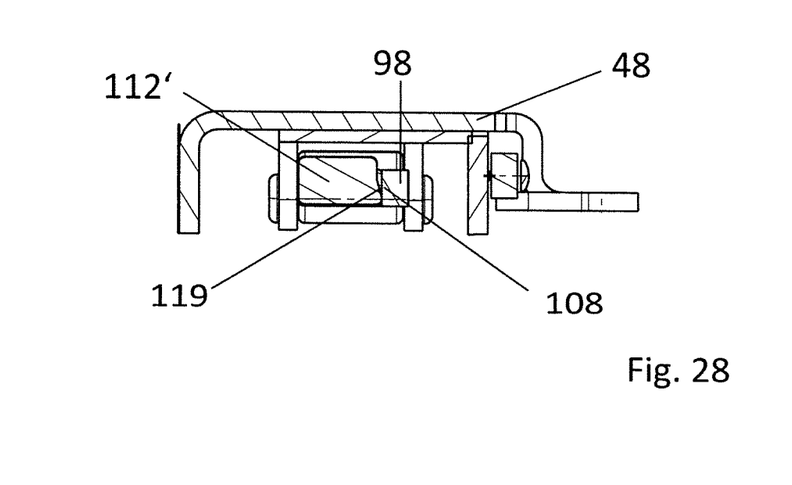
FIG. 28 shows a section through the locking unit according to FIG. 15 that corresponds to FIG. 26, but for the activated position of the securing stud.

In FIGS. 14 to 28, a locking device 32' is illustrated that largely corresponds to the locking device according to FIGS. 2 to 13, but differs from the same in that it presents a trigger element 112' that is realized as a lever that presents a lateral adjusting surface 119 on one side that interacts with a control surface 108 of the ratchet 98 for the securing stud 94. The trigger element 112' can be pivoted about an axis that is formed by a bearing journal 120 and extends in the longitudinal direction of the top. At its side facing away from the adjusting surface 108, the trigger element 112' has a tab 122 that constitutes an adjusting end and rests against a plate 124 of the roof shell 20 or also of a front bow of a folding top. If the plate 124 is deformed in an accident situation as illustrated in FIGS. 27 and 28, the trigger element 112' is pivoted about the bearing journal 120, whereby the adjusting surface 119 slides along the control surface 108 of the ratchet 98, pivoting the same about the bearing journal 104, whereby the projection 100 is pulled out of the lateral recess of the securing stud 94 and the securing stud 94 can shoot into its blocked position.

Apart from that, locking device 32' corresponds to the locking device according to FIGS. 2 to 13.

The invention claimed is:

1. A locking device for fixing a top of a convertible vehicle at a front header of a convertible vehicle, comprising an actuating portion and an engagement portion, said actuating portion comprising a locking hook pivotable between a cleared position and a closed position in which it is engaged with the engagement portion, wherein a securing element assumes a rest position during normal operation and is pretensioned in the direction of a blocked position using a spring and that is secured in the rest position using a retaining element that is adjustable by way of a trigger element in such a manner that the securing element is released and that the spring shifts the securing element into its blocked position so that the securing element secures the locking hook in the closed position thereof.

2. The locking device according to claim 1, wherein the securing element is a securing stud.

3. The locking device according to claim 1, wherein the retaining element is a ratchet.

4. The locking device according to claim 3, wherein the trigger element is a lever having an adjusting surface against which the ratchet rests.

5. The locking device according to claim 4, wherein the lever is borne so as to be pivotable and presents an adjusting mass that pivots the lever starting from a certain lateral acceleration.

6. The locking device according to claim 4, wherein the lever presents an adjusting end for resting against a deformable element of the top.

7. The locking device according to claim 3, wherein the ratchet is realized as a lever that is borne so as to be pivotable and that presents a projection that engages with a lateral recess of the securing element in the rest position.

8. The locking device according to claim 3, wherein the ratchet, using a retaining spring, is pressed against the securing element.

9. The locking device according to claim 1, wherein the actuating portion comprises a link arrangement for adjusting the locking hook.

10. The locking device according to claim 9, wherein the locking hook and the link arrangement are a part of a four-arm hinge arrangement.

11. The locking device according to claim 9, wherein the link arrangement comprises the locking hook, which is articulated to an articulation lever and to a control lever, and the articulation lever and the control lever are articulated to a locking support.

12. The locking device according to claim 1, wherein an opening spring pretensions the locking hook in the direction of its cleared position.

13. The locking device according to claim 1, wherein an adjusting lever is provided that presents an active leg at whose edge an adjusting element for actuating the locking hook between its closed position and its cleared position slides and/or rolls off.

14. The locking device according to claim 13, wherein the edge of the adjusting lever forms a cam surface that presents a first holding notch for the adjusting element that is assigned to the cleared position of the locking hook and a second holding notch for the adjusting element that is assigned to the closed position of the locking hook.

15. The locking device according to claim 13, wherein the adjusting lever presents a stop leg that interacts with a first stop assigned to the cleared position of the locking hook and with a second stop assigned to the closed position of the locking hook.

16. A top of a convertible vehicle, comprising a locking device according to claim 1.

* * * * *